(12) United States Patent
Brouwer

(10) Patent No.: US 7,392,567 B2
(45) Date of Patent: Jul. 1, 2008

(54) HINGE ACTUATOR AND METHOD FOR ADJUSTING TWO PARTS OF A HINGE ACTUATOR RELATIVE TO EACH OTHER

(75) Inventor: Stefan Frits Brouwer, Den Haag (NL)

(73) Assignee: MCi (Mirror Controls International) Netherlands B.V. (NL)

( * ) Notice: Subject to any disclaimer, the term of this patent is extended or adjusted under 35 U.S.C. 154(b) by 0 days.

(21) Appl. No.: 11/500,088

(22) Filed: Aug. 7, 2006

(65) Prior Publication Data
US 2007/0029180 A1 Feb. 8, 2007

Related U.S. Application Data

(63) Continuation of application No. PCT/NL2005/000082, filed on Feb. 4, 2005.

(51) Int. Cl.
*B60R 1/07* (2006.01)
*B60R 1/06* (2006.01)
(52) U.S. Cl. ........................................ 16/235
(58) Field of Classification Search ........... 16/334–336, 16/341, 325, 344; 24/68 CD; 74/575
See application file for complete search history.

(56) References Cited

U.S. PATENT DOCUMENTS 3,484,831 A * 12/1969 Higuchi ................. 16/333
5,560,086 A * 10/1996 Huang .................... 24/68 CD
2003/0218812 A1  11/2003 Foote et al.

FOREIGN PATENT DOCUMENTS

| DE | 198 33 672 A | 5/1999 |
|---|---|---|
| EP | 1 238 858 A2 | 9/2002 |
| WO | WO 03/011642 A1 | 2/2003 |

OTHER PUBLICATIONS

International Search Report for App. No. PCT/NL2005/000082 Mailed May 19, 2005.
International Preliminary Report on Patentability (IPRP 1) for App. No. PCT/NL2005/000082 Mailed Aug. 17, 2006.

* cited by examiner

*Primary Examiner*—Robert J. Sandy
(74) *Attorney, Agent, or Firm*—Dykema Gossett PLLC

(57) ABSTRACT

A hinge actuator having a first part and a second part. The first part being connected to the second part so as to be hingeable about a geometric axis. The actuator includes a signaling means for signaling a select or predetermined angular position of the first and second parts relative to each other, the signaling means being arranged for signaling the select or predetermined angular position in only one pivoting direction.

20 Claims, 6 Drawing Sheets

HINGE ACTUATOR AND METHOD FOR ADJUSTING TWO PARTS OF A HINGE ACTUATOR RELATIVE TO EACH OTHER

CROSS-REFERENCE TO RELATED APPLICATION

This application is a continuation of International PCT Application No. PCT/NL2005/000082, with an international filing date of Feb. 4, 2005, which claims the benefit of priority to Netherlands Application No. 1025433, filed Feb. 6, 2004, each of which applications are fully incorporated herein by reference.

TECHNICAL FIELD

The invention relates to a hinge actuator, including a hinge actuator for use in a wing mirror unit, in particular for a motor vehicle.

SUMMARY

The invention relates to a hinge actuator comprising a first part which is connected with a second part so as to be hingeable about a geometric axis. The hinge actuator may be used, for instance, in connection with a wing mirror unit for a motor vehicle.

In an embodiment, a first part comprises, for instance, a base plate which can be fixedly attached to the motor vehicle and which is provided with a base shaft whose centerline coincides with the geometric axis. Further, a second part can comprise a supporting frame extending around the base shaft, for supporting a mirror housing. A supporting frame can pivot relative to the first part, for instance to a select or predefined position, such as a folded-in position to reduce the width of the vehicle, for instance after parking, or a folded-out position for use of the wing mirror unit under normal operating conditions.

Often, the two parts of the hinge actuator can be pivoted both electrically and non-electrically, for instance manually, to the folded-in or folded-out position, which are normally defined by stops cooperating in at least one pivoting direction.

In connection with the operation of the hinge actuator, it may be desirable to be able to establish when a select or predetermined position is being approached or when it has been reached. A problem then presenting itself is that the behavior of the actuator upon manual operation is essentially different from that upon electric operation. Information about the angular position that is relevant to manual operation may consequently be confusing for an electric operation and vice versa.

An object of the invention is to provide a hinge actuator of the type mentioned above, in which disadvantages are prevented, while advantages are maintained. In an embodiment, the hinge actuator includes a signaling means for signaling a select or predetermined position of the two parts relative to each other, the signaling means being arranged for signaling the select or predetermined angular position in only one pivoting direction.

By signaling the select or predetermined position only in one pivoting direction, confusion can already be obviated in a large number of cases. What can thus be achieved, specifically, is that upon adjustment in a first pivoting direction, at a particular angular position, a signal is produced, while upon adjustment in the opposite direction, given the same angular position, such signal is not produced.

This makes it for instance possible, when approaching a folded-out position, to produce a signal that can be used for manual operation to signal that the folded-out position has been reached, while upon pivoting back from the folded-out position, this signal can be suppressed, thereby avoiding the electric operation being switched off by this signal.

Upon the select or predetermined position being reached, the signaling means generate a physical signal, for instance an optical or electronic signal.

In an embodiment, the signaling means comprises blocking means which are freely rotatable relative to each other in a first pivoting direction, and in a second, opposing or opposite pivoting direction are restrained from rotation in the select or predetermined angular position.

As the blocking means are freely rotatable in the first pivoting direction, and in the second pivoting direction are restrained from rotation in the select or predetermined angular position, a hinge actuator can be provided in which the select or predetermined angular position of the two parts of the actuator in the second pivoting direction can be signaled by means of a physical reaction force.

In an embodiment, the blocking means comprises a ratchet mechanism, so that a free rotation in the first pivoting direction and a lock from rotation in the second pivoting direction may be provided in a simple manner.

Advantageously, the ratchet mechanism may comprise a slip ring that cooperates with one of the parts of the actuator by means of locking means.

The locking means may define the select or predetermined angular position in which the blocking means are restrained from rotation in the second pivoting direction.

In an embodiment, the locking means comprise a set of resilient fingers which can cooperate with corresponding cams on a first part of the actuator. Upon pivotal movement in the first pivoting direction, the fingers can slide along the cams without generating appreciable friction, so that the slip ring can rotate freely. In one embodiment, the set of resilient fingers are attached to the slip ring, while the cams are provided on the first part of the actuator. Of course, it is also possible to provide the cams on the slip ring and to equip the first part with the fingers.

By providing the other part of the actuator with a carrier for carrying along the slip ring in the first pivoting direction, the other part is coupled to the slip ring, optionally with an extent of free travel.

By having the ratchet mechanism, which may include a drive cam and a cam track, cooperate with the second part of the actuator, an ingenious coupling between the ratchet mechanism and the second part can be provided.

Through such a construction, the second part is not rigidly attached to the ratchet mechanism, so that an additional degree of freedom in the design can be obtained, which can be utilized, for instance, for an additional free travel of the two parts relative to each other.

In another embodiment, the cam track can comprise a rising surface which constitutes the projecting part of a sawtoothed profile and as a stop in the second pivoting direction cooperates disengageably with the drive cam for defining a select or predetermined angular position between a first and a second part of a hinge actuator. In this way, with an associated slip ring being locked from rotation, a disengagement of the second part can be realized in a controlled manner.

In an embodiment, upon pivoting of the two parts in the second pivoting direction, the drive cam drives the stop, and hence the slip ring, in the second pivoting direction until the set of resilient fingers engage the cams. Thus, the slip ring is restrained from rotation relative to the first part of the actuator. Upon further pivoting, the cooperating drive cam and the stop generate increasingly a counteracting force to define the select or predetermined position of the two parts. By pivoting still further, the counteracting force can be largely removed, since the drive cam moves over the teeth and the coupling between the second part and the slip ring is largely undone.

By uncoupling the stop, the second part is uncoupled from the slip ring. As the two parts pivot back in the first pivoting direction, then, under the influence of the drive cam, also the slip ring with the stop pivots back into the first pivoting direction.

Preferably, the first part of the actuator is connected with the second part via an electric drive as well, so that the two parts can be electrically adjusted. Furthermore, there may be provided a coupling between the first and the second part, so that in a first position of the coupling the first part and the second part are connected via the drive and can be pivoted relative to each other with the drive, and in a second position the first part and the second part are not connected via the drive and can for instance be pivoted relative to each other by hand. By the use of the coupling between the two parts, the electric drive can be uncoupled, so that a pivotal motion of the hinge actuator not caused by the drive, for instance a manual pivoting, does not force any movements of the drive and prevents damage to the electric drive, such as fractures in a drive train or defects in an electric motor. Also, an overfold position can then be reached, whereby a pivotal motion beyond the folded-out position is realized. This occurs, for instance, when the actuator is being pivoted too roughly from the folded-in position to the folded-out position, or when the vehicle reverses and the mirror unit impacts a piece of road furniture, such as a pillar. By pivoting the mirror unit back, the wing mirror unit can be moved into the folded-out position again.

Advantageously, the coupling means in the select or predetermined positions are also restrained from rotation in the first pivoting direction when the coupling is in the second position. As a result, a hinge actuator is obtained in which during manual adjustment a clear coupling is sensed when the select or predetermined angle between the two parts is reached. Both pivoting in the first and in the second pivoting direction is thereby counteracted. Moreover, the electric drive can still pivot the first part relative to the second part in the opposite pivoting direction, also from the select or predetermined position, since the rotation lock in the first pivoting direction is not active in the first position of the coupling, in which the electric drive can pivot the first and second parts relative to each other. Also upon manual operation in case of external forces on the hinge actuator, such as wind, undesirable pivoting is prevented, since a powerful coupling in the select or predetermined position has been obtained.

The rotation lock in the first pivoting direction can be designed to be so powerful that the electric drive could not overcome it. As a consequence, an extra powerful coupling is sensed when pivoting the hinge actuator by hand, which is desirable when it is used in wing mirror units of particular types of motor vehicles. Since the rotation lock in the first pivoting direction is not in action when the coupling is in the first position, it is still easy for the electric drive to perform an adjustment in the first pivoting direction. As a consequence, there is no need to use unduly powerful and costly electric motors, while yet a powerful coupling in the select or predetermined position is obtained.

The invention also relates to a method for adjusting two parts of a hinge actuator relative to each other.

Further advantageous embodiments of the invention are set forth in the claims.

Aspects of the invention will be further elucidated on the basis of exemplary embodiments which are represented in the drawings. In the drawings.

The figures are only schematic representations of preferred embodiments of the invention. In the figures, the same or corresponding parts are indicated with the same reference numerals.

Figure 1:
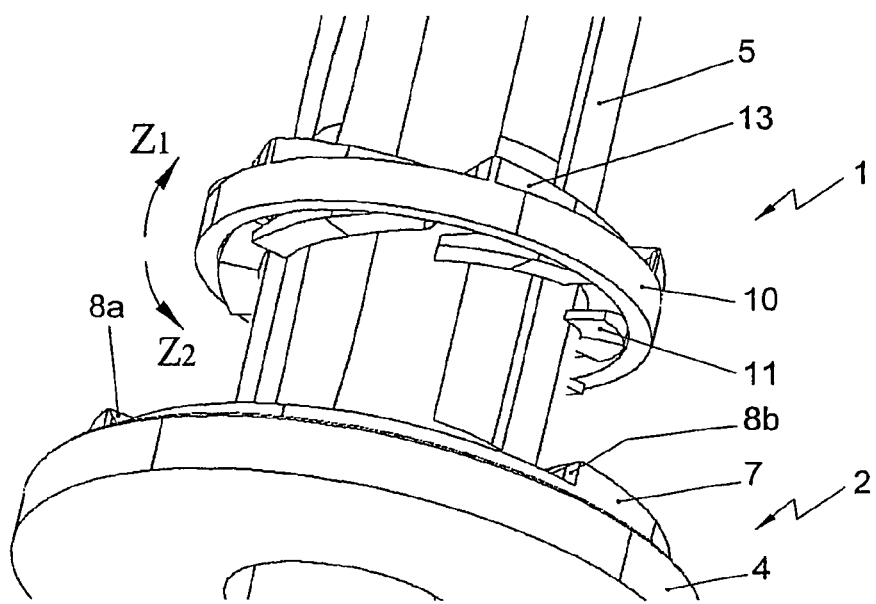
FIG. 1 shows a first schematic perspective view of a part of an embodiment of a hinge actuator.
Figure 2:
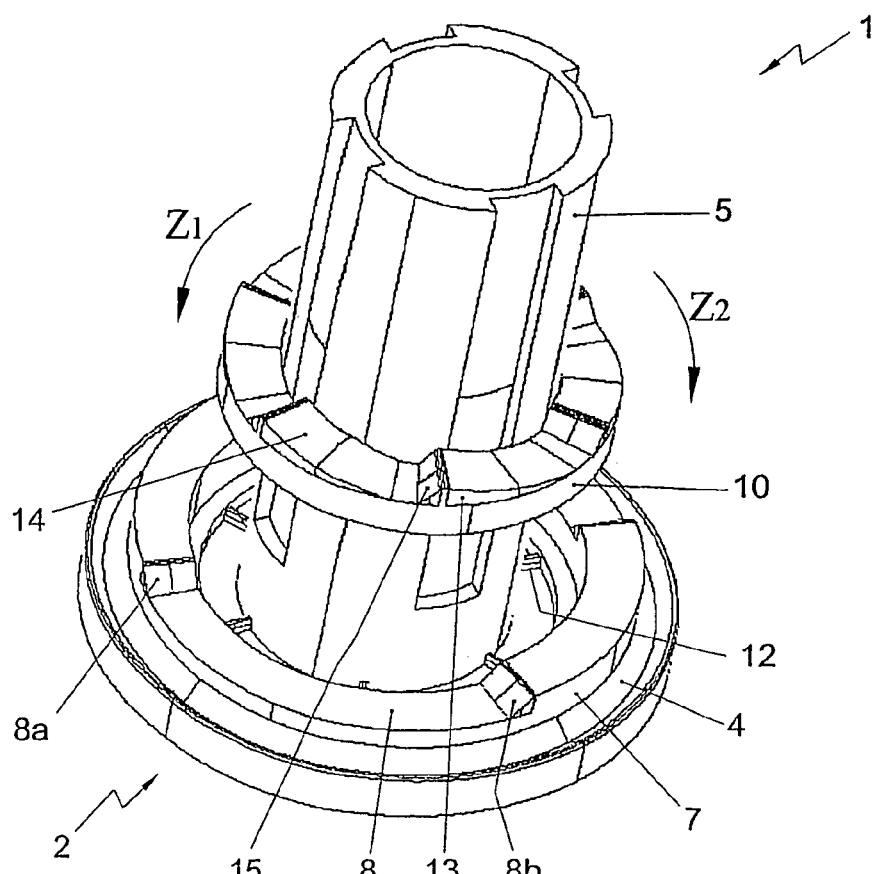
FIG. 2 shows a second schematic perspective view of a part of the hinge actuator of FIG. 1.

FIGS. 1 and 2 show a hinge actuator 1 according to an embodiment of the invention. The hinge actuator 1 has a first part, designed as a base part 2, and a second part, designed as a supporting frame (not shown), which can pivot relative to each other. The base part 2 can be fixedly attached to a motor vehicle, and has a base flange 4 on which a fixed base shaft 5 is arranged. The supporting frame extends around the base shaft 5 and can support a mirror housing which accommodates a mirror glass, so that the whole can serve as a wing mirror unit of a motor vehicle. During pivoting of the hinge actuator 1, the supporting frame hinges about the base shaft 5.

Arranged on the base flange 4 is a base ring 7 which likewise extends around the base shaft 5. The side of the base ring 7 remote from the base flange 4 is at least partly formed as a first cam track 8 to be traversed by a drive cam which is fixedly attached to the supporting frame. The cam track 8 comprises a substantially planar portion which is bounded at the ends by two inclined butting faces 8a, 8b which form stops cooperating with the drive cam in a pivoting direction for defining a predetermined position of the actuator parts relative to each other, such as a folded-in position of the wing mirror unit which is suitable for performing parking maneuvers and a folded-out position for normal use of the motor vehicle in traffic.

Arranged around the base shaft 5 is a ratchet mechanism, designed as slip ring 10, which forms a part of blocking means of the hinge actuator 1.

The slip ring 10 is provided, on the side facing the base flange 4, with locking means, designed as a set of resilient fingers 11 which cooperate in predetermined angular positions with corresponding cams 12 which also form part of the blocking means and are arranged on the base flange 4. The side of the slip ring 10 facing away from the base flange 4 is provided with a second cam track 13, designed as a sawtoothed profile with a rising surface 14 and a part 15 of steep configuration. The second cam track 13 also cooperates with the drive cam which is fixedly attached to the supporting frame and forms a carrier, by which the supporting frame is coupled to the slip ring 10.

Upon pivoting of the supporting frame in a first pivoting direction Z1, anticlockwise viewed from the base shaft 5 to the base flange 4, the drive cam drives, by way of the steep part 15 of the saw-toothed profile, the slip coupling clear of lock in the first pivoting direction Z1, since the set of resilient fingers 11 slide virtually without friction like a ratchet mechanism along the cams 12 on the base flange 4. Upon pivoting of the supporting frame in a second pivoting direction Z2, which is opposite to the first pivoting direction Z1, the drive cam drives the slip ring 10 via the rising surface 14, which now functions as stop, in the second pivoting direction Z2 until at least one finger 11 cooperates in a predetermined position with a cam 12. The drive cam 9 and the rising surface 14 then define a disengageable, predetermined angular position of the supporting frame relative to the base flange 4. By pivoting the supporting frame further in the second pivoting direction Z2 with an increased couple, the drive cam slides over the rising surface 14 and the steep part 15 of the saw-toothed profile, so that the coupling between the supporting frame and the slip ring 10 is released. This produces a signal which indicates in the case of manual operation that the folded-out position has been reached. When pivoting back in the first pivoting direction Z1, no coupling is sensed anymore, since the fingers 11 cooperate with the cams 12 only in the second pivoting direction Z2. As a result, when pivoting back, the above-mentioned signal is not produced. This obviates the electric operation being switched off in error as a result of the signal.

In the embodiment shown, the drive cam 9 cooperates with both the first and the second cam track 8, 13. To that end, the drive cam is oriented so widely as to enable cooperation with the butting and rising surfaces 8a, 8b, 14, 15 of both the first and the second cam track 8, 13. Instead of one integrated drive cam, however, two drive cams may be provided, which, if desired, may include an angle with respect to each other.

The principle of the slip ring 10, as described with reference to FIG. 1 and FIG. 2, is also used in an embodiment of the hinge actuator 1 according to an embodiment of the invention, as shown in other figures.

Figure 3:
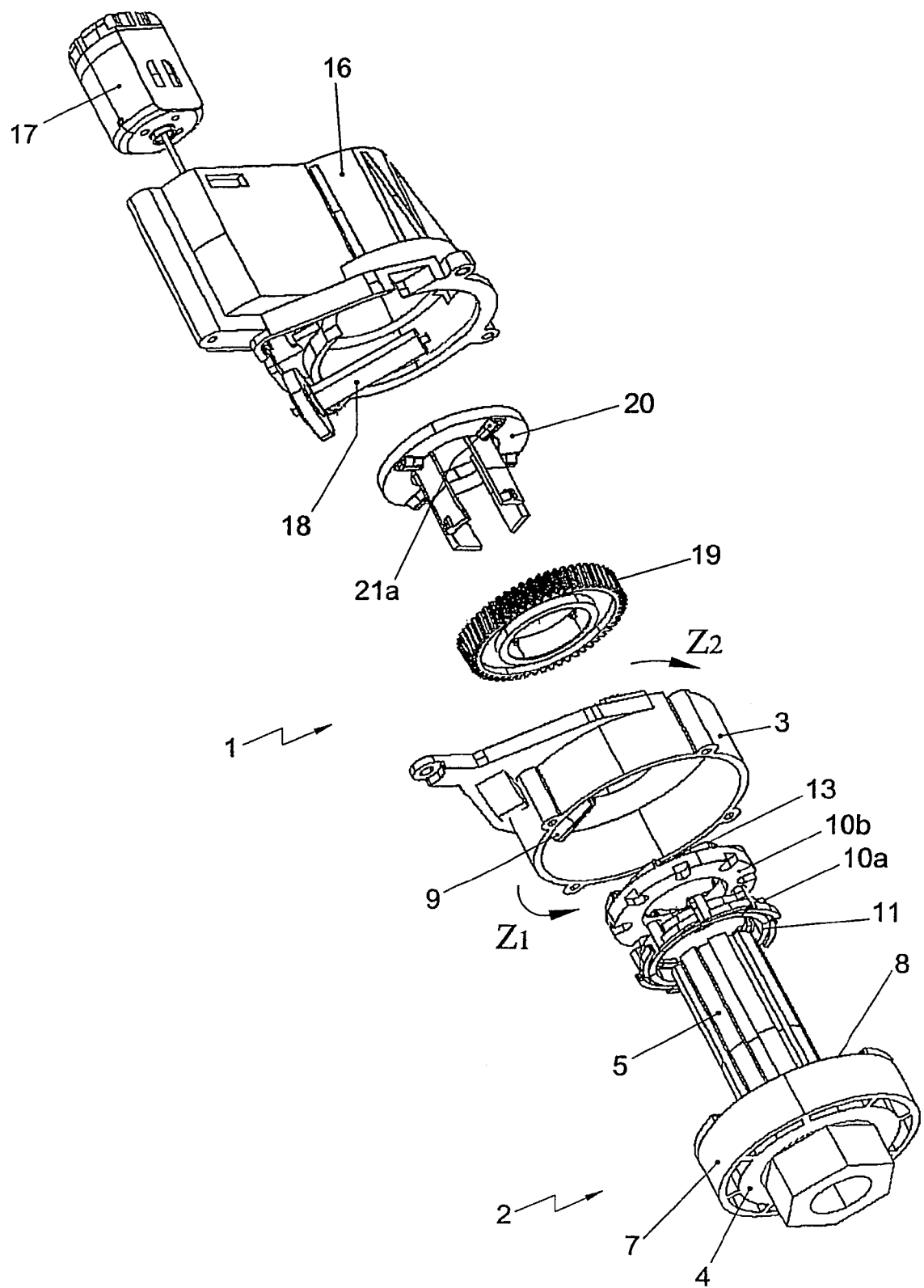
FIG. 3 shows a first schematic perspective view of an embodiment of a hinge actuator in disassembled condition.
Figure 4:
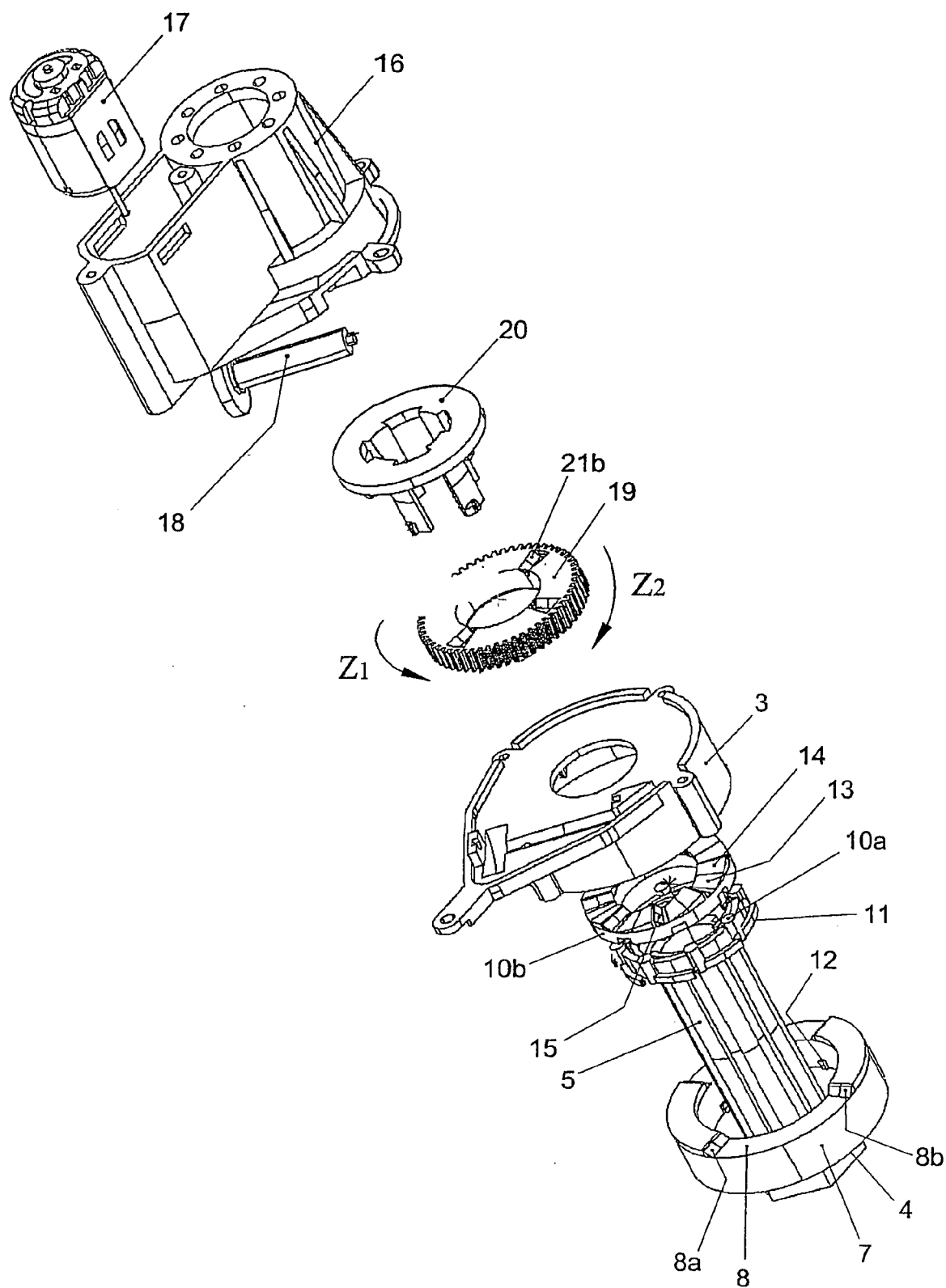
FIG. 4 shows a second schematic perspective view of the hinge actuator of FIG. 3 in disassembled condition.
Figure 5:
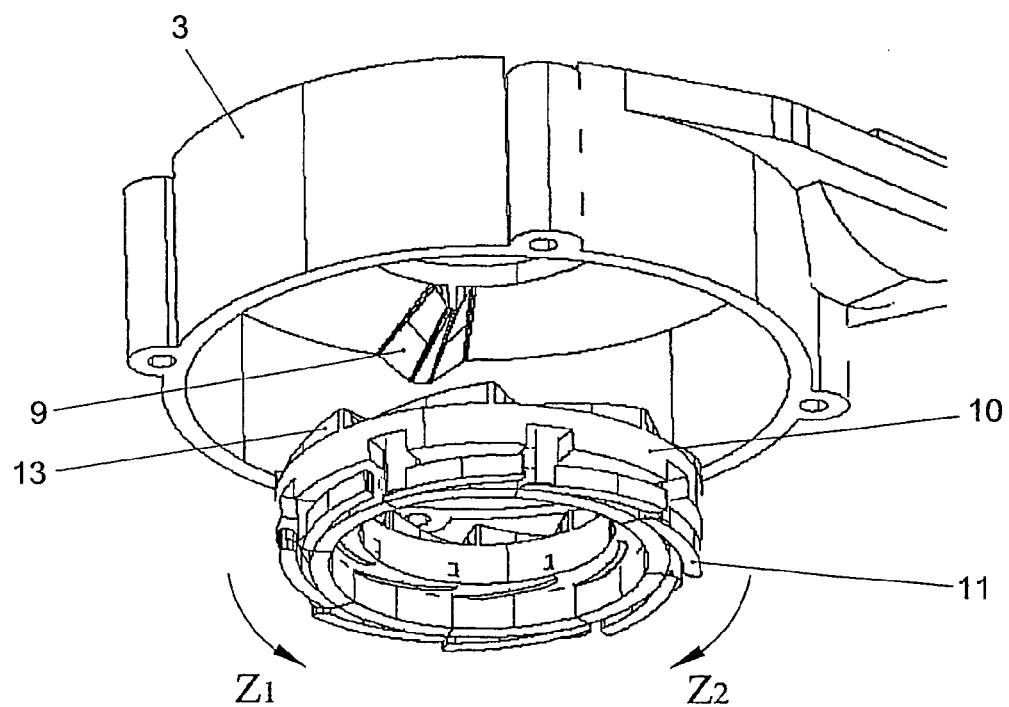
FIG. 5 shows a schematic perspective view of a coupling ring and an output part of the electric drive of the hinge actuator of FIG. 3.
Figure 9:
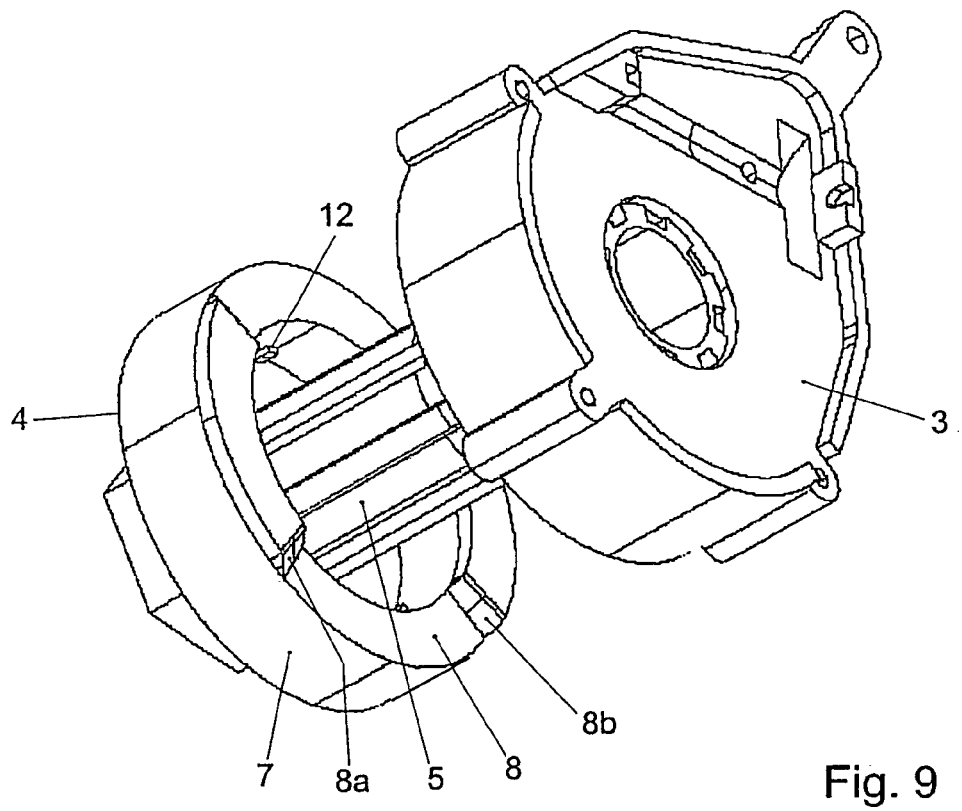
FIG. 9 shows a first schematic perspective view of a base flange, a base shaft and a supporting frame of the hinge actuator of FIG. 3.
Figure 10:
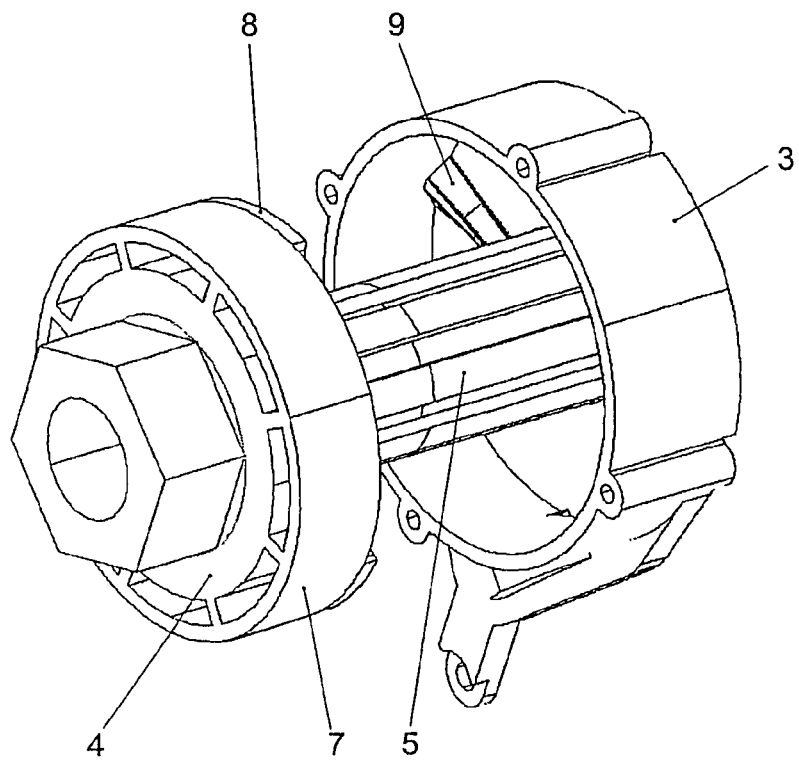
FIG. 10 shows a first schematic perspective view of a base flange, a base shaft and a supporting frame of the hinge actuator of FIG. 3.

FIGS. 3 and 4 show a second embodiment of the hinge actuator 1 in disassembled condition. Like the first embodiment, the hinge actuator 1 has a first part with a base flange 4, a base shaft 5, a base ring 7 including a first cam track 8, a second part which is designed as a supporting frame 3, on which a drive cam 9 is arranged, as shown in more detail in FIG. 5. In FIGS. 9 and 10, the supporting frame 3, the base shaft 5 and the base plate 4 are shown in more detail. Furthermore, around the base shaft 5, a slip ring is arranged which is built up from two slip ring modules 10a, 10b, designed to be rigid relative to each other, having a first set of resilient fingers 11 which cooperate in the second pivoting direction Z2 with corresponding cams 12 which are provided on the base ring 7. Also, the slip ring modules have a second cam track 13 with a rising surface 14 and a part 15 of steep configuration, which form a saw-toothed profile and which likewise cooperate with the drive cam 9.

Figure 6:
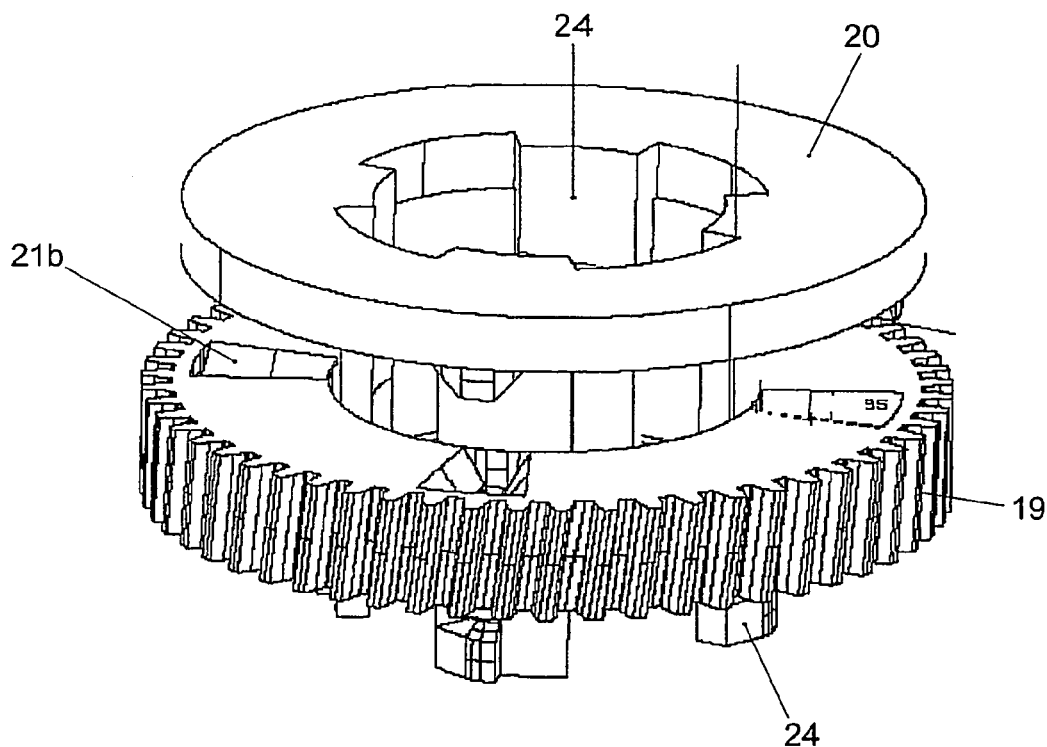
FIG. 6 shows a schematic perspective view of a slip ring and a supporting frame of the hinge actuator of FIG. 3.

The supporting frame 3 supports a mirror housing 16 in which an electric drive is included, comprising an electric motor 17 which, via an output part 18, drives a gear wheel 19 for electrically adjusting the supporting frame 3 relative to the base flange 4. The gear wheel 19 is positioned around the base shaft 5 and rotation-locked relative to the base shaft 5 by means of a disengageable coupling. In the figures shown, the coupling comprises a coupling ring which is axially movable relative to the base shaft 5 and is disengageably coupled with the gear wheel 19 through a cam construction 21. The cam construction 21 comprises, for instance, a cam 21a and a recess or stop 21b, as shown in more detail in FIG. 6. In a first position of the coupling, the hinge actuator 1 can be electrically adjusted, while in a second position of the coupling this can be done in a non-electrical manner, for instance manually, without causing damage to the electric drive.

By constructing the coupling with the coupling ring 20 which is disengageably rotation-coupled and axially movable relative to the base shaft 5, the first and the second position can be defined in a relatively simple manner. In the event of an external couple greater than a pre-set level, the coupling ring 20 moves axially from a first axial position which defines the first position to a second axial position which defines the second axial position. When at pivoting of the supporting frame 3 relative to the base flange 4 the electric drive is switched on, the coupling ring 20 moves back again to the first axial position. Of course, other disengageable constructions can be used for reliably defining the axial positions of the coupling ring 20, such as, for instance, rolling elements in guide tracks.

According to the basic principle of the hinge actuator 1, as described with regard to the embodiment, shown in FIGS. 1 and 2, the supporting frame can rotate freely in the first pivoting direction Z1, while in the second pivoting direction Z2, a select or predetermined angular position is defined.

Figure 7:
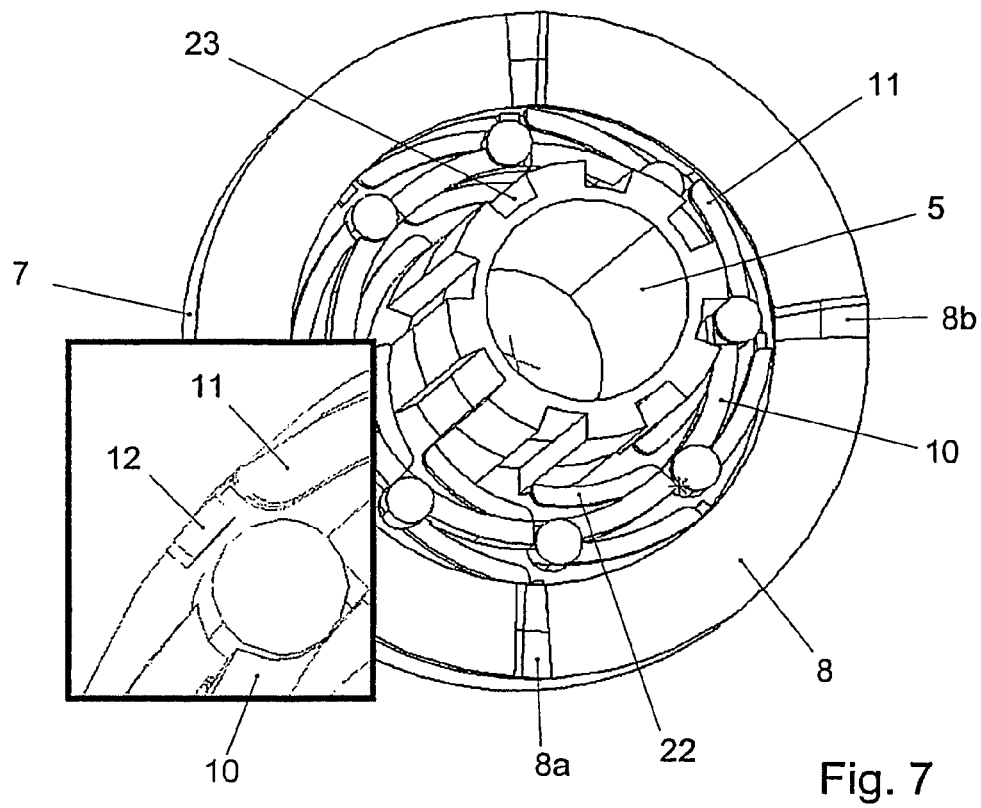
FIG. 7 shows a schematic perspective view of a slip ring and a base shaft of the hinge actuator of FIG. 3.
Figure 8:
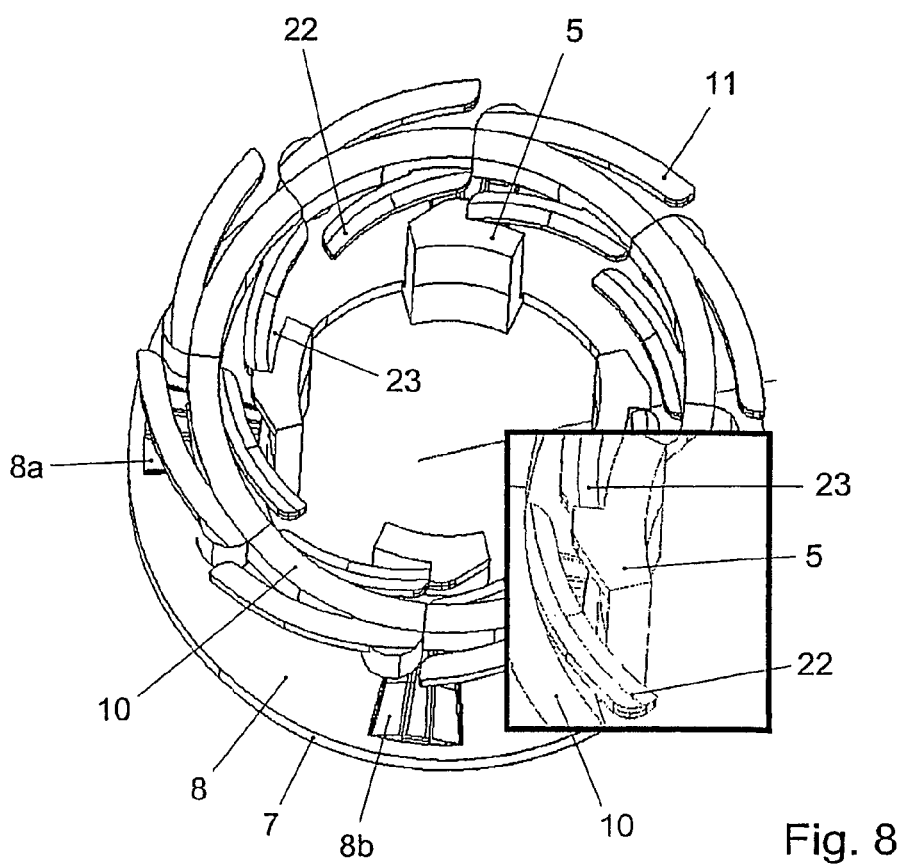
FIG. 8 shows a schematic perspective view of a slip ring and sections of a base shaft of the hinge actuator of FIG. 3.

Furthermore, the slip ring 10 may comprise a second set of resilient fingers 22, as shown in more detail in FIGS. 7 and 8, which can cooperate in the first pivoting direction Z1 with axial recesses 23 in the base shaft 5. To realize a proper operation of the second set of resilient fingers 22, the coupling ring 20 is provided with legs 24 which are oriented substantially axially along the outer wall of the base shaft 5. In a first axial position of the coupling ring 20, in which the supporting frame 3 and the base flange 4 are connected via the electrical drive, the legs 24 are situated between the second set of resilient fingers 22 and the recesses 23 in the base shaft 5, so that rotation lock is prevented. In a second axial position of the coupling ring 20, in which the supporting frame 3 can pivot relative to the base flange 4 whilst clear of the electric drive, the legs 24 release the second set of resilient fingers 22, so that rotation lock is possible.

When, with the supporting frame 3 having reached the select or predetermined angular position relative to the base flange 4, the first set of resilient fingers 11 prevent further pivoting of the slip ring 10 in the second pivoting direction Z2, and the drive cam 9 of the supporting frame 3 slides over the rising surface 14 and the steep part 15 of the saw-toothed profile as a result of a non-electrical force, also the rotation lock of the second set of fingers 22 with the recesses 23 in the base shaft 5 comes into operation, so that the slip ring 10 cannot pivot back in the first pivoting direction Z1 either and hence is wholly rotation-locked with respect to the base shaft 5. Through a suitable angular division of the first and the second cam track 6, 13, the drive cam 9 is situated between the steep part 15 of the second cam track 13 and the butting surface 8a of the first cam track 8, so that the supporting frame 3 is coupled in the select or predetermined position relative to the base flange 4. Via the butting surface 8a, the drive cam 9 can still uncouple upon a relatively large couple in the second pivoting direction Z2 so as to enable an overfold position of the mirror unit.

Through this hinge construction, in case of non-electric adjustment, for instance manual operation, a properly sensible coupling in a select or predetermined angular position of the supporting frame 3 relative to the base flange 4 can be realized, while the supporting frame 3 can yet pivot back in the first pivoting direction Z via the electric drive, since the coupling ring 20 is then situated in the first axial position and hence prevents, with the aid of the legs 24, rotation lock with the second set of resilient fingers 22 and the axial recesses 23.

The invention is not limited to the exemplary embodiments described here. Many variants are possible.

For instance, the gear wheel may be integrated with the coupling ring, while the coupling ring is disengageably rotation-locked with respect to the base shaft.

Instead of axially oriented resilient fingers, such as shown in FIGS. 1 and 2, the fingers can also extend in a different direction, for instance radially inwards or outwards.

Also, the resilient fingers and the corresponding cams and/or recesses can be constructed in mutually interchanged positions.

Such variants will be clear to the skilled person and are understood to fall within the scope of the invention as set forth in the following claims.

What is claimed is:

1. A hinge actuator, comprising:
   a first part;
   a second part, the first part being connected with the second part so as to be hingeable about a geometric axis;
   an electric drive for connecting the first part to the second part; and
   a signaling means for signaling a select or predetermined angular position of the first and second parts relative to each other, the signaling means being arranged for signaling the select or predetermined angular position in only one pivoting direction.

2. The hinge actuator according to claim 1, wherein the signaling means comprise blocking means, the blocking means being freely rotatable a first pivoting direction and being rotation-locked in the select or predetermined angular position of the first and second parts in a second pivoting direction, wherein the second pivoting direction is generally opposite the first pivoting direction.

3. The hinge actuator according to claim 2, wherein the blocking means comprise a ratchet mechanism, and the ratchet mechanism locks a locking means from rotation relative to each other in the select or predetermined angular position in the second pivoting direction.

4. The hinge actuator according to claim 3, wherein the ratchet mechanism comprises a slip ring, the slip ring freely rotatable in the first pivoting direction about the geometric axis and the slip ring including a locking means which cooperate in the second pivoting direction with one of the first and second parts.

5. The hinge actuator according to claim 4, wherein the locking means cooperate with one of the first and second parts via a first set of resilient fingers and corresponding cams.

6. The hinge actuator according to claim 5, wherein the slip ring cooperates with the first part via a second set of resilient fingers and corresponding cams.

7. The hinge actuator according to claim 4, further comprising a carrier for carrying the slip ring along in the first pivoting direction, the carrier being positioned on one of the first and second parts not cooperating with the locking means.

8. The hinge actuator according to claim 7, wherein the carrier cooperates with one of the first and second parts via a drive cam and a cam track.

9. The hinge actuator according to claim 8, wherein the cam track comprises a rising surface which forms a projection of a saw-toothed profile, the projection forming a stop cooperating disengageably with the drive cam in the second pivoting direction for defining the select or predetermined angular position between the first and second parts.

10. The hinge actuator according to claim 1, wherein the first part comprises a base plate including a base shaft and the second part comprises a supporting frame extending around the base shaft for supporting a mirror housing.

11. The hinge actuator according to claim 1, further comprising a coupling between the first part and the second part, wherein the first part and the second part are connected via the drive and can be pivoted relative to each other with the drive in a first position of the coupling and wherein the first part and the second part are not connected via the drive and can only be pivoted relative to each other manually in a second position of the coupling.

12. The hinge actuator according to claim 11, wherein the coupling comprises a coupling ring that is disengageably rotation-coupled and axially moveable between the first position and the second position with respect to a base shaft.

13. The hinge actuator according to claim 11, wherein the coupling in the select or predetermined position is locked from rotation in the first pivoting direction when the coupling is in the second position.

14. The hinge actuator according to claim 12, wherein the coupling ring comprises screening surfaces for screening a second set of fingers to prevent rotation lock in the first pivoting direction in the first position and for leaving the second set of fingers clear to enable lock from rotation in the first pivoting direction in the second position.

15. A hinge actuator, comprising:
    a first part;
    a second part, the first part being connected with the second part so as to be hingeable about a geometric axis; and
    a signaling means for signaling a select or predetermined angular position of the first and second parts relative to each other, the signaling means being arranged for signaling the select or predetermined angular position in only one pivoting direction;
    wherein the signaling means comprise blocking means, the blocking means being freely rotatable in a first pivoting direction and being rotation-locked in the select or predetermined angular position of the first and second parts in a second pivoting direction, the second pivoting direction is generally opposite the first pivoting direction; the blocking means comprise a ratchet mechanism, and the ratchet mechanism locks a locking means from rotation relative to each other in the select or predetermined angular position in the second pivoting direction; and the ratchet mechanism comprises a slip ring, the slip ring freely rotatable in the first pivoting direction about the geometric axis and the slip ring including a locking means which cooperate in the second pivoting direction with one of the first and second parts.

16. The hinge actuator according to claim 15, wherein the locking means cooperate with one of the first and second parts via a first set of resilient fingers and corresponding cams.

17. The hinge actuator according to claim 16, wherein the slip ring cooperates with the first part via a second set of resilient fingers and corresponding cams.

18. The hinge actuator according to claim 15, further comprising a carrier for carrying the slip ring along in the first pivoting direction, the carrier being positioned on one of the first and second parts not cooperating with the locking means.

19. The hinge actuator according to claim 18, wherein the carrier cooperates with one of the first and second parts via a drive cam and a cam track.

20. The hinge actuator according to claim 19, wherein the cam track comprises a rising surface which forms a projection of a saw-toothed profile, the projection forming a stop cooperating disengageably with the drive cam in the second pivoting direction for defining the select or predetermined angular position between the first and second parts.

* * * * *